US012146634B2

(12) United States Patent
Song et al.

(10) Patent No.: US 12,146,634 B2
(45) Date of Patent: Nov. 19, 2024

(54) HIDDEN LAMP FOR VEHICLE

(71) Applicant: HYUNDAI MOBIS CO., LTD., Seoul (KR)

(72) Inventors: Kiryong Song, Yongin-si (KR); Bong Gi Jeon, Seoul (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 18/493,689

(22) Filed: Oct. 24, 2023

(65) Prior Publication Data

US 2024/0200752 A1 Jun. 20, 2024

(30) Foreign Application Priority Data

Dec. 20, 2022 (KR) ........................ 10-2022-0178935

(51) Int. Cl.
*F21S 43/50* (2018.01)
*F21S 43/20* (2018.01)

(52) U.S. Cl.
CPC ............... *F21S 43/50* (2018.01); *F21S 43/20* (2018.01)

(58) Field of Classification Search
CPC ........... F21S 43/243–245; F21S 43/255; F21S 43/20; F21S 43/50
See application file for complete search history.

(56) References Cited

U.S. PATENT DOCUMENTS 2,380,691 A * 7/1945 Gross ....................... F21V 11/00 362/354
2,907,249 A * 10/1959 Hjermstad ............... G02B 3/08 359/542

FOREIGN PATENT DOCUMENTS

CN 115342323 A * 11/2022 ............ F21S 41/265
DE 102021207238 A1 * 2/2022 ............ F21S 41/265
DE 102022118948 A1 * 6/2023 ............ B60Q 1/381
KR 2018-0000547 1/2018

OTHER PUBLICATIONS

Innovation Q+ NPL Search (Year: 2024).*
English Language Abstract of KR 2018-0000547 published Jan. 3, 2018.

* cited by examiner

*Primary Examiner* — Anabel Ton
(74) *Attorney, Agent, or Firm* — DLA Piper LLP US

(57) ABSTRACT

A hidden lamp for a vehicle which may implement a pattern shape, and in the hidden lamp, only an outside exposure shield unit may be visible when a light source unit is not lit, and light may be emitted through a micro-pattern formed by a light-emitting region when the light source unit is turned on. As a result, the hidden lamp may emit light in a light pattern of a set design, thereby implementing a differentiated lighting image.

16 Claims, 7 Drawing Sheets

FIG. 2
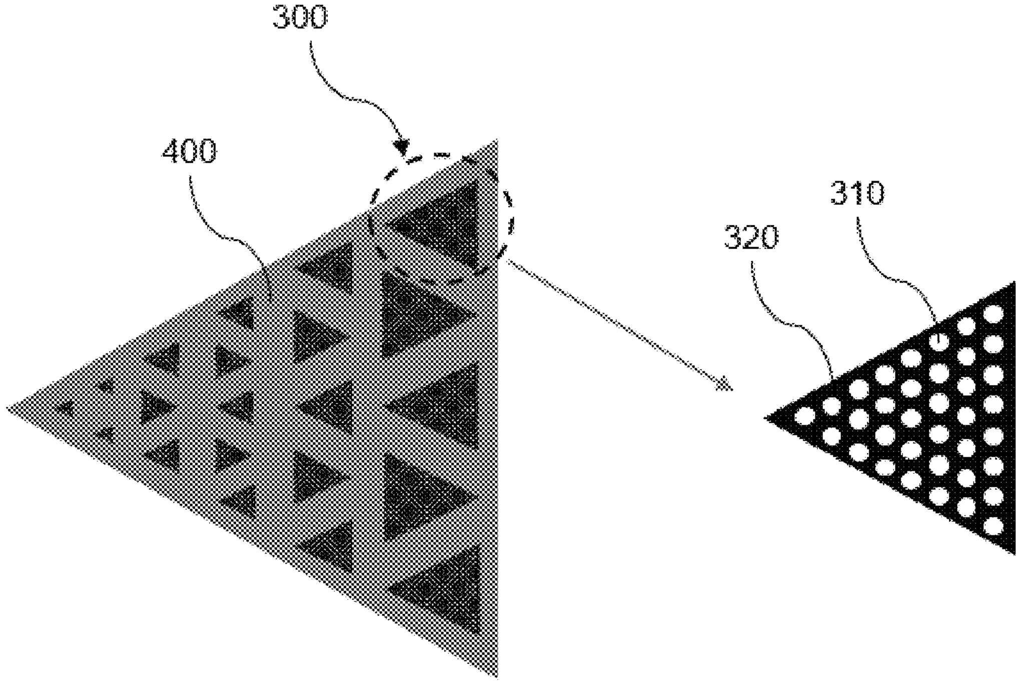
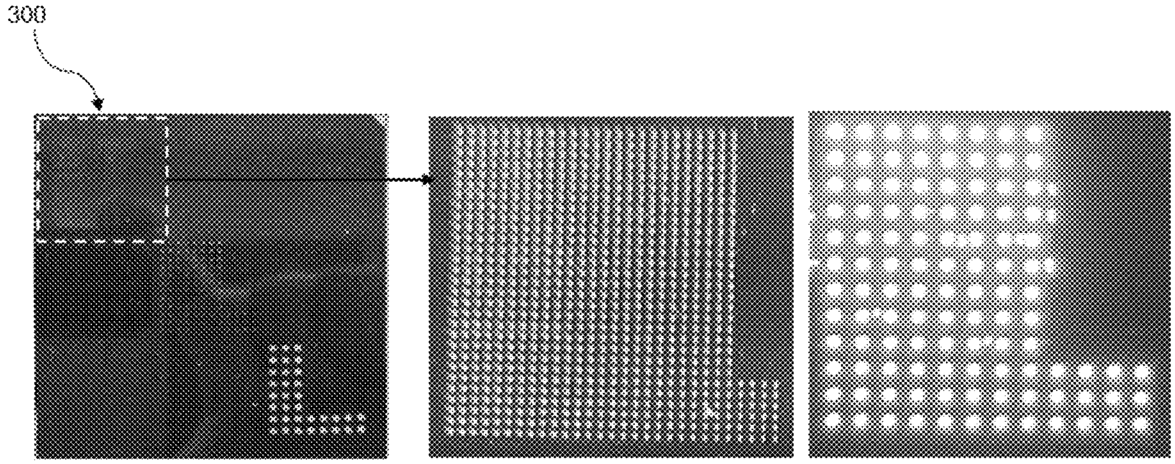
FIG. 3A FIG. 3B

300(310, 320)

HIDDEN LAMP FOR VEHICLE

CROSS-REFERENCE TO RELATED APPLICATIONS

This application claims priority under 35 U.S.C. § 119 to Korean Patent Application No. 10-2022-0178935, filed on Dec. 20, 2022, in the Korean Intellectual Property Office, the disclosure of which is incorporated herein by reference in its entirety.

TECHNICAL FIELD

The following disclosure relates to a hidden lamp for a vehicle which may implement a pattern shape.

BACKGROUND

Vehicles are on a trend of electrification as an electric vehicle market recently expands. Vehicle electrification may indicate that vehicle driving and other related functions are assisted or replaced by motors and batteries.

This electrification trend makes a lighting section of the vehicle extend to a radiator grill. Here, an optical system referred to as body color hidden lighting may have a concept of making it difficult to distinguish a vehicle body and the lighting section of the vehicle from each other.

In addition, the body color hidden lighting may use a mirror surface coated with chrome (Cr) or aluminum (Al), such as a half mirror using a conventional low-transmission mirror surface deposition method. In addition, the body color hidden lighting may use a lens applied with painting and laser micro-pattern perforation.

However, these conventional methods have design limitations and fail to satisfy the concept of body color. In addition, a process for satisfying the concept of body color through the painting may cause a higher cost and a restriction on color selection.

RELATED ART DOCUMENT

Patent Document (Patent Document 1) Korean Patent Laid-Open Publication No. 10-2018-0000547 (published on Jan. 3, 2018)

SUMMARY

An embodiment of the present disclosure is directed to providing a hidden lamp which may implement a hidden lighting optical system printing a pattern design on a lens unit by using a pad printing method for a shield region and a light-emitting region to be distinguished from each other.

In one general aspect, a hidden lamp includes: a lens unit; a pattern forming shield unit disposed at the rear of the lens unit, and having a light-emitting region where light is emitted and a shield region which is a region other than the light-emitting region and where light is blocked; and a light source unit emitting the light.

The hidden lamp may further include an outside exposure shield unit having a shape corresponding to that of the pattern forming shield unit, disposed between the lens unit and the pattern forming shield unit, and having one surface where light is blocked and the other surface exposed through the lens unit.

The pattern forming shield unit and the outside exposure shield unit may have similar or the same colors as each other.

Light transmittance of the shield region may be 40% or less.

In the pattern forming shield unit, the plurality of light-emitting regions may be gathered to form a set light pattern.

An area of one light-emitting region may be 100 $mm^2$ or less.

The shield region may be classified based on a level of the light transmittance.

The lens unit may be a shape lens convex or concave to its surface where light is emitted.

The lens unit may have a corroded surface formed on a rear surface thereof.

BRIEF DESCRIPTION OF THE DRAWINGS

FIG. 2 is a view showing a light pattern for a vehicle according to an embodiment of the present disclosure.

FIGS. 3A and 3B are views showing that the light pattern for a vehicle emits light according to an embodiment of the present disclosure.

DETAILED DESCRIPTION OF EMBODIMENTS

Hereinafter, specific embodiments of the present disclosure are described with reference to the drawings.

Further, in describing the embodiments of the present disclosure, omitted is a detailed description of a case where it is decided that the detailed description for the known function or configuration related to the present disclosure may unnecessarily obscure the gist of the present disclosure.

Figure 1:
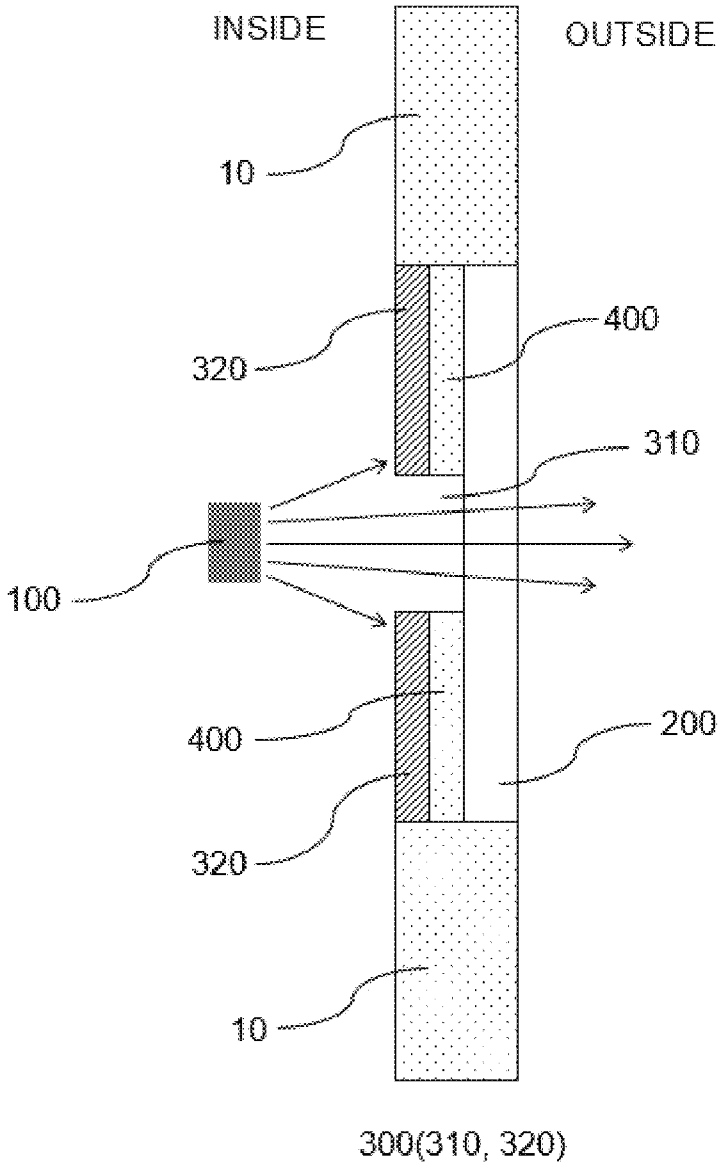
FIG. 1 is a cross-sectional view showing a configuration of a hidden lamp for a vehicle according to an embodiment of the present disclosure.

Referring to FIG. 1, according to an embodiment of the present disclosure, a hidden lamp for a vehicle may include a light source unit 100 including a light source such as a light emitting diode (LED) emitting light from the inside of a lamp, a lens unit 200, and a pattern forming shield unit 300 disposed at the rear of the lens unit 200 to form a set light pattern to the outside by light.

The light source unit 100 may use both of a direct light method of directly emitting light or an indirect light method using a reflecting surface and a light guide. The light source unit 100 may be disposed at the rear of the lens unit 200 positioned in the hidden lamp. Here, the inside of the hidden lamp indicates the rear of the lens unit 200, and the outside thereof indicates the front of the lens unit 200. The same is applied to the following description.

The pattern forming shield unit 300 may be disposed at the rear of the lens unit 200. The pattern forming shield unit 300 may have a light-emitting region 310 where light is emitted and a shield region 320 which is a region other than the light-emitting region 310 and where light is blocked. The light-emitting region 310 may be a region where light is emitted from the rear of the lens unit 200 to the front, and the shielded region 320 may be a region where light is blocked so that no light is emitted from the rear of the lens unit 200 to the front.

Here, the pattern forming shield unit 300 may be positioned on a rear surface of the lens unit 200. (The rear surface may be a surface of the lens unit 200 that faces the rear). The pattern forming shield unit 300 may be positioned on the rear surface of the lens unit 200 by using a pad printing method. The lens unit 200 may form the set light pattern by allowing light to be emitted from the light-emitting region 310 and light to be blocked from the shielded region 320. A pattern formed by the light-emitting region 310 and the shield region 320 may be printed on the rear surface of the lens unit 200 by the pad printing method. When using the pad printing method, only one printing process is required for forming the pattern to thus increase a production efficiency of the hidden lamp. Here, the pad printing method is a well-known technique, and a detailed description thereof is thus omitted.

In addition, an outside exposure shield unit 400 may be disposed between the lens unit 200 and the pattern forming shield unit 300. The outside exposure shield unit 400 may have a shape corresponding to that of the pattern forming shield unit 300. The outside exposure shield unit 400 may have one surface where light is blocked and the other surface exposed through the lens unit 200.

Here, the pattern forming shield unit 300 may be disposed on the rear surface of the outside exposure shield unit 400. The pattern forming shield unit 300 may be printed on the rear surface of the outside exposure shield unit 400 by using the pad printing method.

The outside exposure shield unit 400 may be a structure extending from a support 10 where the lens unit 200 is installed. The outside exposure shield unit 400 may be a component forming a part of the support unit 10, and have the same or similar color as the support unit 10. In addition, the color of the pattern forming shield unit 300 and the color of the outside exposure shield unit 400 may be the same or similar to each other, thus easily implementing a hidden lighting structure in which it is difficult to distinguish a lit region and a non-lit region from each other when viewing from the outside of the lens unit 200 if the light source unit 100 is turned off.

The shield region 320 and the light-emitting region 310 forming a micro-pattern may be simultaneously printed using the pad printing method, and these regions may have the same color. The shield region 320 may serve to block light so that light is not emitted to the outside. Here, in order to implement the shield region 320 when performing the printing, for a color having high brightness, additional printing of the shield region 320 may be performed after color printing, and for a color having low brightness, the additional printing of the shield region 320 may be omitted.

Only the outside exposure shield unit 400 may be visible when the light source unit 100 is not lit. Light may be emitted through the micro-pattern formed by the light-emitting region 310 when the light source unit 100 is turned on. As a result, the hidden lamp may emit light in the light pattern of a set design, thereby implementing a differentiated lighting image.

In order to effectively implement the above light pattern, light transmittance of the shield region 320 may be set to 40% or less.

If the outside exposure shield unit 400 is printed in the same color as an exterior structure, it is preferable to perform printing about 1 to 6 times to achieve a consistent color match with the exterior structure. At this time, for the shield region 320 to achieve light-blocking performance, it is preferable to perform printing about 1 to 4 times.

Referring to FIG. 2 together, the pattern forming shield unit 300 may form the set pattern. As shown in FIG. 2, the pattern forming shield unit 300 may form a polygonal pattern such as a triangle. In addition, when enlarging the pattern, the plurality of light-emitting regions 310 may be gathered to form another set light pattern. Here, an area of one light-emitting region may be 100 $mm^2$ or less.

Referring to FIGS. 3A-3B together, the pattern forming shield unit 300 may form a pattern as shown in FIG. 3A, and may form a light pattern as shown in FIG. 3B when light is emitted. As may be seen in FIGS. 3A-3B, the present disclosure may have a structure in which it is difficult to distinguish a region when light is emitted and light is not emitted.

The outside exposure shield unit 400 may extend to the light-emitting region 310. At this time, the outside exposure shield unit 400 may print an area located in the light-emitting region 310 in the same color as the exterior structure. Printing for shielding may not be applied or halftone dot printing may be applied to the area located in the light-emitting region 310 in the outside exposure shield unit 400. Through this, the area located in the light-emitting region 310 in the outside exposure shield unit 400 when the light source unit 100 is not turned on can be made indistinguishable from the unlit area, and when the light source unit 100 is turned on, light can pass through the light-emitting region 310.

Here, dot imprinting is a method of printing full of fine dots in a designated area under the DPI (Dot Per Inch) concept, and the fine pattern is formed into very small-scale dots of several micrometers in size.

Figure 4:
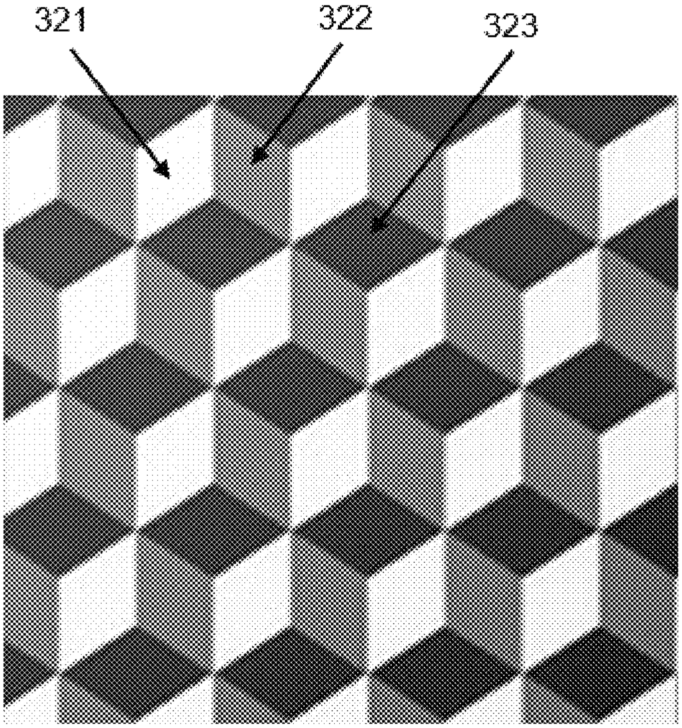
FIG. 4 is a view showing a three-dimensional pattern for a vehicle according to an embodiment of the present disclosure.
Figure 5:
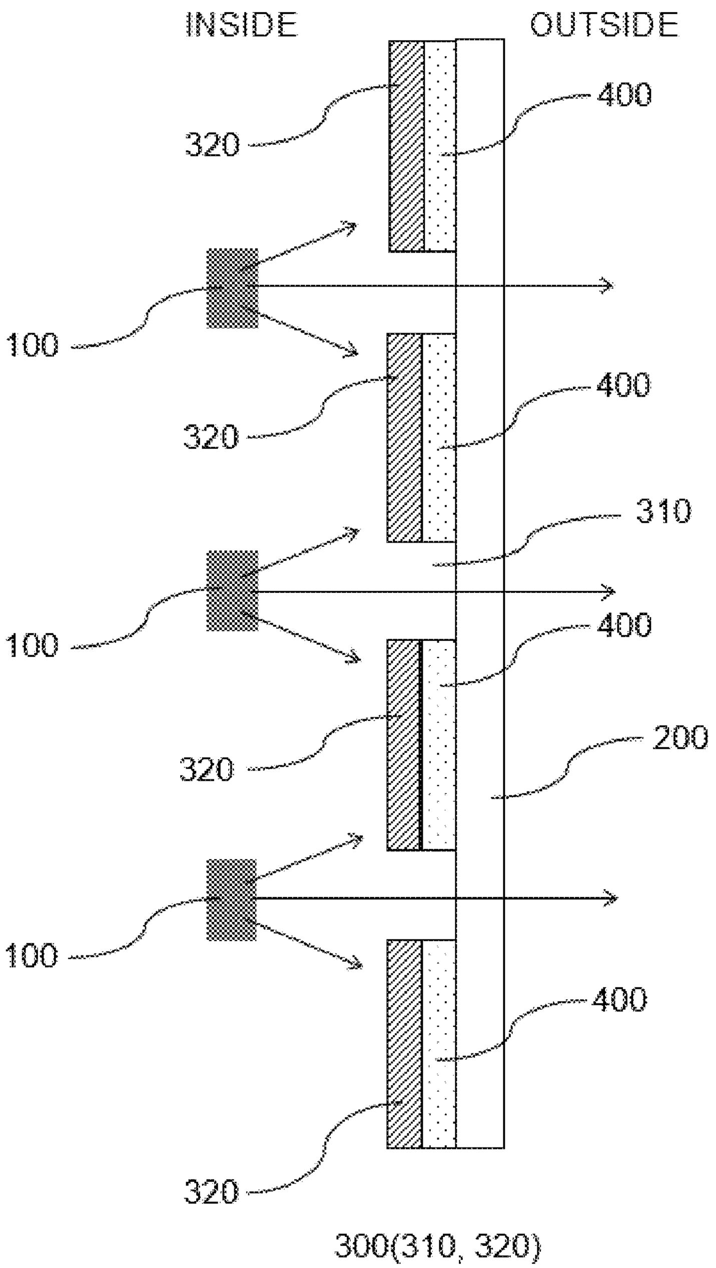
FIG. 5 is a cross-sectional view showing a configuration of a hidden lamp for a vehicle according to an embodiment of the present disclosure.

Referring to FIGS. 4 and 5 together, the shield region 320 may be classified based on a level of the light transmittance. As shown in FIG. 4, a three-dimensional shape having a vanishing point in the center may be configured by configuring the shield region 320 to have a contrast difference. The light transmittance of the shield region 320 may be configured in an order of a high transmittance region 321, a medium transmittance region 322, and a low transmittance region 323.

Figure 6A:
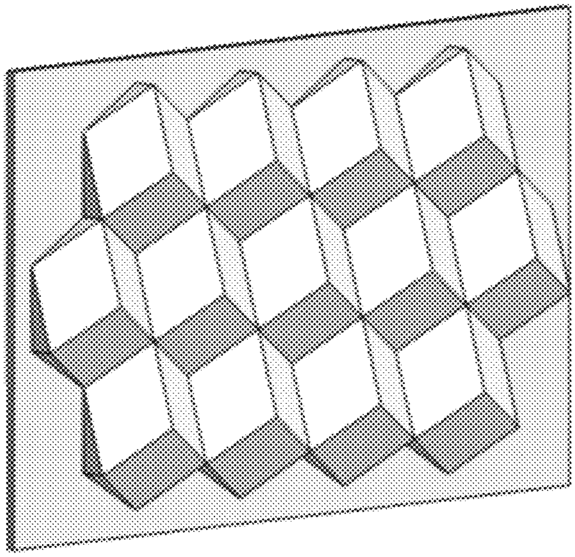
FIGS. 6A and 6B are views showing a three-dimensional lens unit in the hidden lamp configuration for a vehicle according to an embodiment of the present disclosure.
Figure 7:
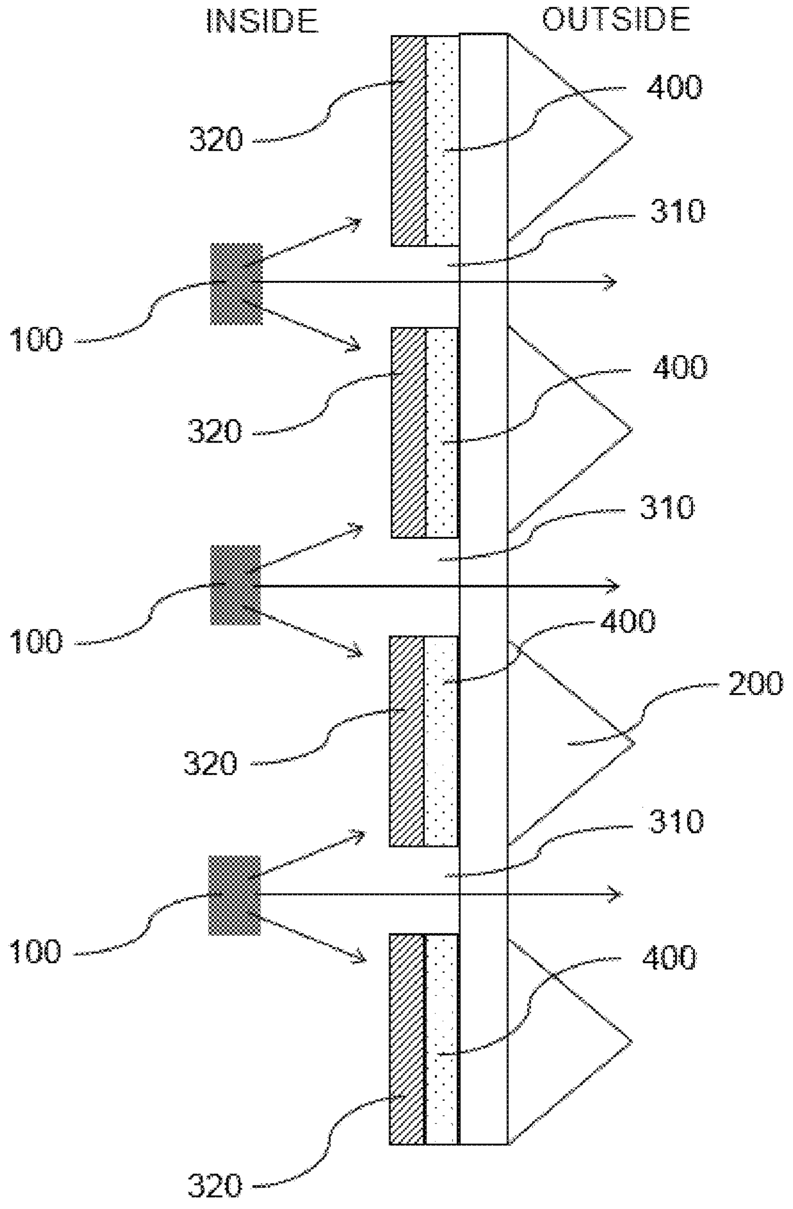
FIG. 7 is a cross-sectional view showing a configuration of a hidden lamp for a vehicle according to an embodiment of the present disclosure.

Referring to FIGS. 6A and 7 together, the lens unit 200 may be a shape lens convex or concave to the front, which is its surface where light is emitted. Through this configuration, it is possible to implement not only the contrast difference but also a three-dimensional image by the shape of the lens unit 200 itself.

Figure 8:
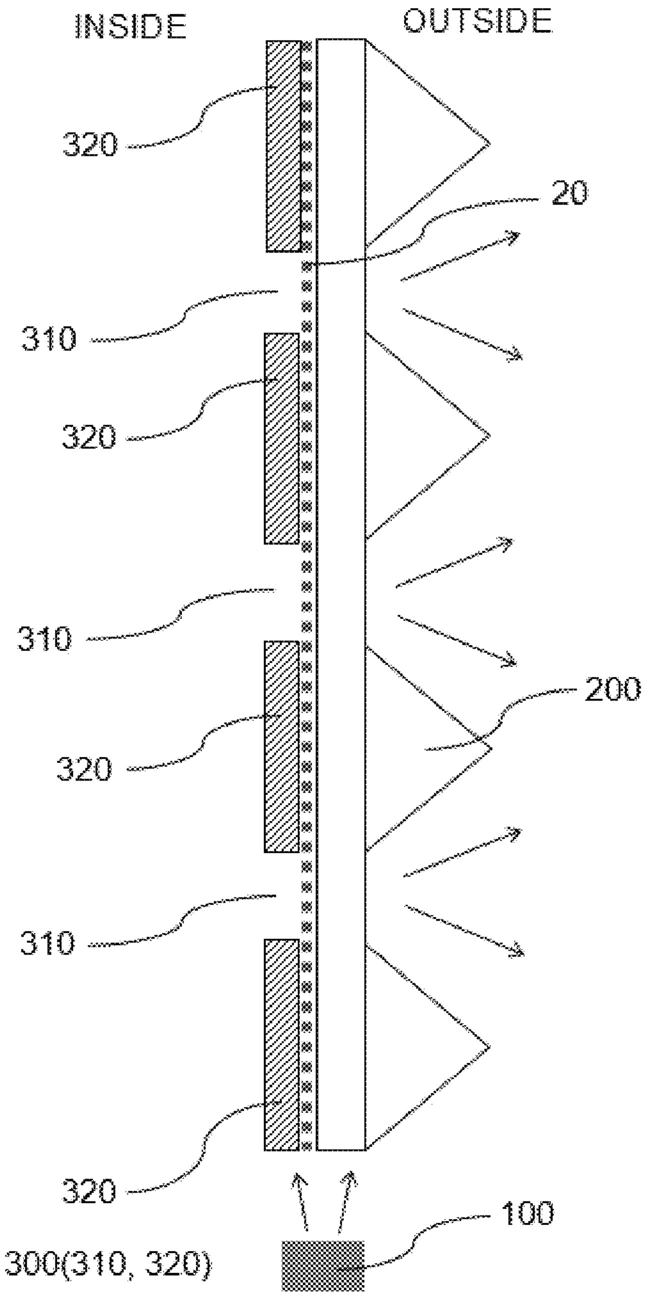
FIG. 8 is a cross-sectional view showing a configuration of a hidden lamp for a vehicle according to an embodiment of the present disclosure.

Referring to FIGS. 8, the lens unit 200 may have a corroded surface 20 formed on the rear surface thereof. The corroded surface 20 may be formed by partially corroding the rear surface of the lens unit 200. As a result, the shield region 320 may be classified into the high transmittance region, the medium transmittance region, and the low transmittance region. In addition, in the case that the lens unit 200 has the corroded surface 20, the light source unit 100 may be disposed on a side surface of the lens unit 200, thus reducing the number of light sources. In addition, in the case of having the corroded surface 20, the lens unit 200 may implement the three-dimensional light pattern even without a physically protruding structure.

Figure 6B:
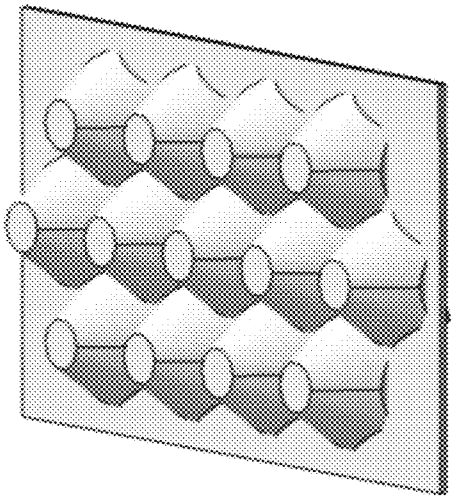

In addition, a total internal reflection (TIR) optical system 210 of FIG. 6B may be disposed at the rear of the lens unit 200, and the light source unit 100 may be disposed at the rear of the TIR optical system 210. The light source unit 100 may implement image expression of various three-dimensional shapes by being disposed for each TIR optical system 210. Here, the TIR optical system 210 may have a protruding hexahedral shape.

As set forth above, in the hidden lamp according to the present disclosure, only the outside exposure shield unit 400 may be visible when the light source unit 100 is not lit, and light may be emitted through the micro-pattern formed by the light-emitting region when the light source unit 100 is turned on. As a result, the hidden lamp may emit light in the light pattern of the set design, thereby implementing the differentiated lighting image.

In addition, the hidden lamp according to the present disclosure may have higher process efficiency, lower material costs, and higher marketability by using the pad printing method that requires fewer processes.

The embodiments of the present disclosure have been described above for illustrative purposes, and those skilled in the art to which the present disclosure pertains will appreciate that various modification and other equivalent embodiments are possible therefrom. Therefore, those skilled in the art will fully understand that the present disclosure is not limited to the specific embodiments described in the detailed description above. Accordingly, an actual technical scope of the present disclosure is to be defined by a technical spirit of the appended claims. In addition, it is to be understood that the present disclosure includes all modifications, equivalents, and substitutes within the spirit and scope of the present disclosure as defined by the appended claims.

What is claimed is:

1. A hidden lamp comprising:
- a lens unit;
- a pattern forming shield unit disposed at a rear of the lens unit, and having a light-emitting region where light is emitted and a shield region which is a region other than the light-emitting region and where light is blocked;
- a light source unit emitting the light; and
- an outside exposure shield unit having a shape corresponding to a shape of the pattern forming shield unit and being disposed between the lens unit and the pattern forming shield unit, and having one surface where light is blocked and another surface exposed through the lens unit.

2. The hidden lamp of claim 1, wherein the pattern forming shield unit and the outside exposure shield unit have similar or same colors as each other.

3. The hidden lamp of claim 1, wherein light transmittance of the shield region is 40% or less.

4. The hidden lamp of claim 1, wherein the light-emitting region comprises a plurality of light-emitting regions gathered to form a set light pattern.

5. The hidden lamp of claim 4, wherein an area of one light-emitting region is 100 $mm^2$ or less.

6. The hidden lamp of claim 4, wherein the shield region is classified based on a level of light transmittance.

7. The hidden lamp of claim 4, wherein the lens unit is a shape lens convex or concave to its surface where light is emitted.

8. The hidden lamp of claim 4, wherein the lens unit has a corroded surface formed on a rear surface thereof.

9. A hidden lamp comprising:
- a lens unit;
- a pattern forming shield unit disposed at a rear of the lens unit, and having a light-emitting region where light is emitted and a shield region which is a region other than the light-emitting region and where light is blocked;
- a light source unit emitting the light; and
- wherein light transmittance of the shield region is 40% or less.

10. The hidden lamp of claim 9, wherein the shield region is classified based on a level of light transmittance.

11. The hidden lamp of claim 9, wherein the lens unit is a shape lens convex or concave to its surface where light is emitted.

12. The hidden lamp of claim 9, wherein the lens unit has a corroded surface formed on a rear surface thereof.

13. A hidden lamp comprising:
- a lens unit;
- a pattern forming shield unit disposed at a rear of the lens unit, and having a light-emitting region where light is emitted and a shield region which is a region other than the light-emitting region and where light is blocked;
- a light source unit emitting the light;
- wherein the light-emitting region comprises a plurality of light-emitting regions gathered to form a set light pattern; and
- wherein an area of one light-emitting region is 100 $mm^2$ or less.

14. The hidden lamp of claim 13, wherein the shield region is classified based on a level of light transmittance.

15. The hidden lamp of claim 13, wherein the lens unit is a shape lens convex or concave to its surface where light is emitted.

16. The hidden lamp of claim 13, wherein the lens unit has a corroded surface formed on a rear surface thereof.

* * * * *